United States Patent [19]

Guttmann

[11] Patent Number: 5,507,190

[45] Date of Patent: Apr. 16, 1996

[54] FLOWMETER WITH IMPROVED END STOPS

[75] Inventor: Emil J. Guttmann, Morton Grove, Ill.

[73] Assignee: Cole-Parmer Instrument Company, Niles, Ill.

[21] Appl. No.: 287,728

[22] Filed: Aug. 9, 1994

[51] Int. Cl.$^6$ .................................................. G01F 5/00
[52] U.S. Cl. .................................................. 73/861.057
[58] Field of Search .......................... 73/861.57, 861.55, 73/861.56

[56] References Cited

U.S. PATENT DOCUMENTS

| | | | |
|---|---|---|---|
| 2,370,634 | 3/1945 | Brewer | 73/861.55 |
| 2,377,861 | 4/1949 | Brewer | 73/861.57 |
| 2,604,784 | 7/1952 | Cox | 73/861.57 |
| 2,707,879 | 5/1955 | Dwyer | 73/861.55 |
| 3,183,713 | 5/1965 | Gilmont | 73/209 |
| 3,218,853 | 11/1965 | Ongaro | 73/208 |
| 3,261,207 | 7/1966 | Gilmont | 73/403 |
| 3,411,357 | 11/1968 | Childs | 73/209 |
| 3,812,715 | 5/1974 | Whalen | 73/209 |
| 4,050,305 | 9/1977 | Evans et al. | 73/209 |
| 4,173,890 | 11/1979 | Gilmont | 73/861.55 |
| 4,245,513 | 1/1981 | Clements et al. | 73/861.55 |
| 4,317,375 | 3/1982 | Egert | 73/861.55 |
| 4,873,872 | 10/1989 | Wechsler | 73/861.57 |
| 5,186,058 | 2/1993 | Lew | 73/861.56 |
| 5,398,721 | 3/1995 | Pryor | 73/861.55 |
| 5,402,686 | 4/1995 | Wittman | 73/861.55 |

FOREIGN PATENT DOCUMENTS

| | | |
|---|---|---|
| 2157279 | 5/1972 | Germany . |
| 489889 | 12/1954 | Italy . |

OTHER PUBLICATIONS

"Gilmont Flowmeters", 4-page brochure from Gilmont Instruments, Barrington, Illinois, undated.
"Gilmont Accucal Flowmeters", 4-page brochure from Gilmont Instruments, Barrington, Illinois, undated.
"Flowmeters: gilmont variable area", Cole Parmer Company, date unknown, pp. 260–268.
1993–1994 Cole–Parmer Company Catalog, "Flowmeters", pp. 400–424.

*Primary Examiner*—Richard Chilcot
*Assistant Examiner*—Jewel V. Artis
*Attorney, Agent, or Firm*—Fitch, Even, Tabin, & Flannery

[57] ABSTRACT

A flowmeter for measuring fluid flow rates in a controlled environment. The flowmeter has an inlet and an outlet and has a vertically disposed conduit and an appropriately dimensioned float disposed within the conduit to move vertically therein. The float moves in response to the opposing forces of the weight of the float and an upward force exerted on the float by an upward fluid flow longitudinally traversing the conduit. The flowmeter also comprises an inlet end stop disposed at the inlet end of the conduit.

The inlet end stop comprises a base section and a flow-divider section, and, preferably, an upright section. The flow-divider section comprises a raised, transversely extending partitioning member. The partitioning member obstructs the vertical fluid flow emerging centrally from the bore thereby causing the fluid flow to diverge into a plurality of flow streams which divergently angle outwardly and upwardly toward the tapered inner surface of the conduit. The divergent flow streams are particularly effective in lowering the threshold fluid flow required to lift an annular float.

20 Claims, 4 Drawing Sheets

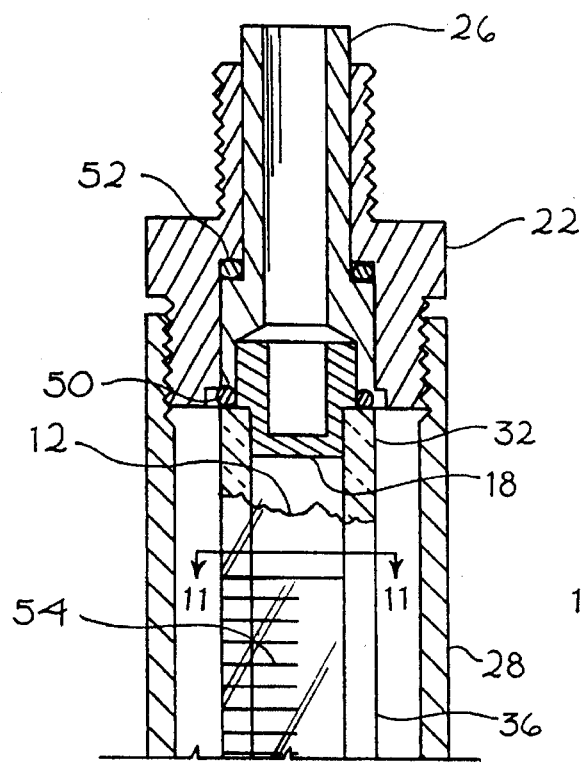
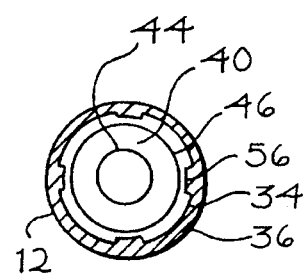
Fig. 11
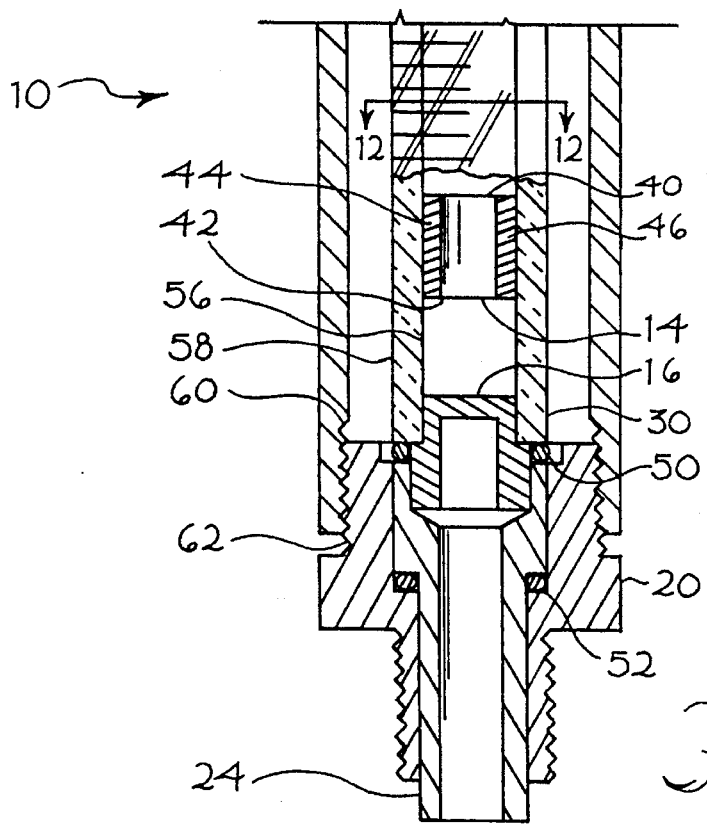
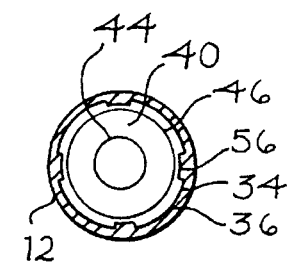
Fig. 12
Fig. 1

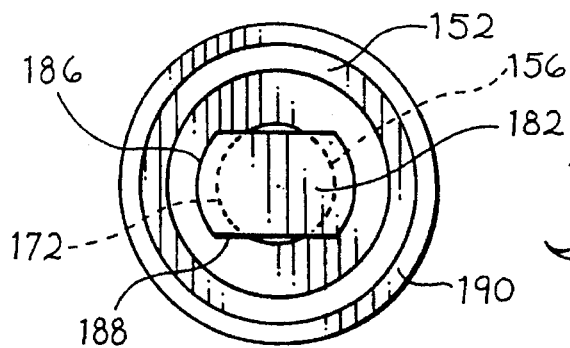
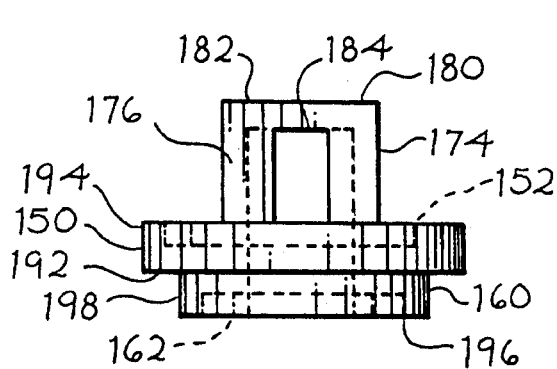 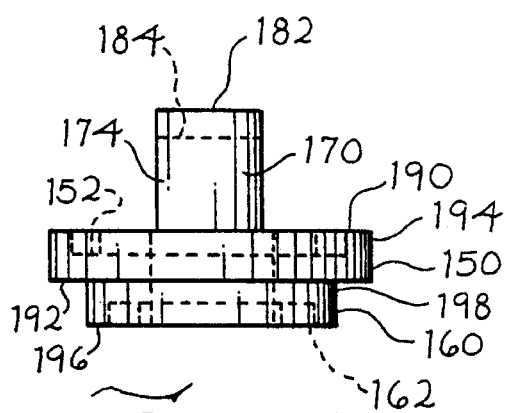
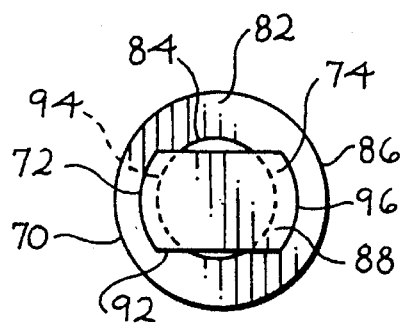
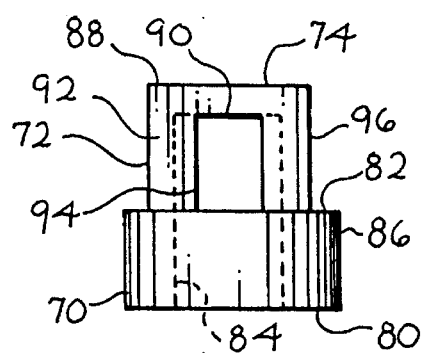 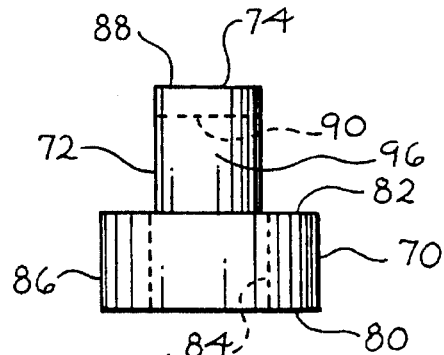

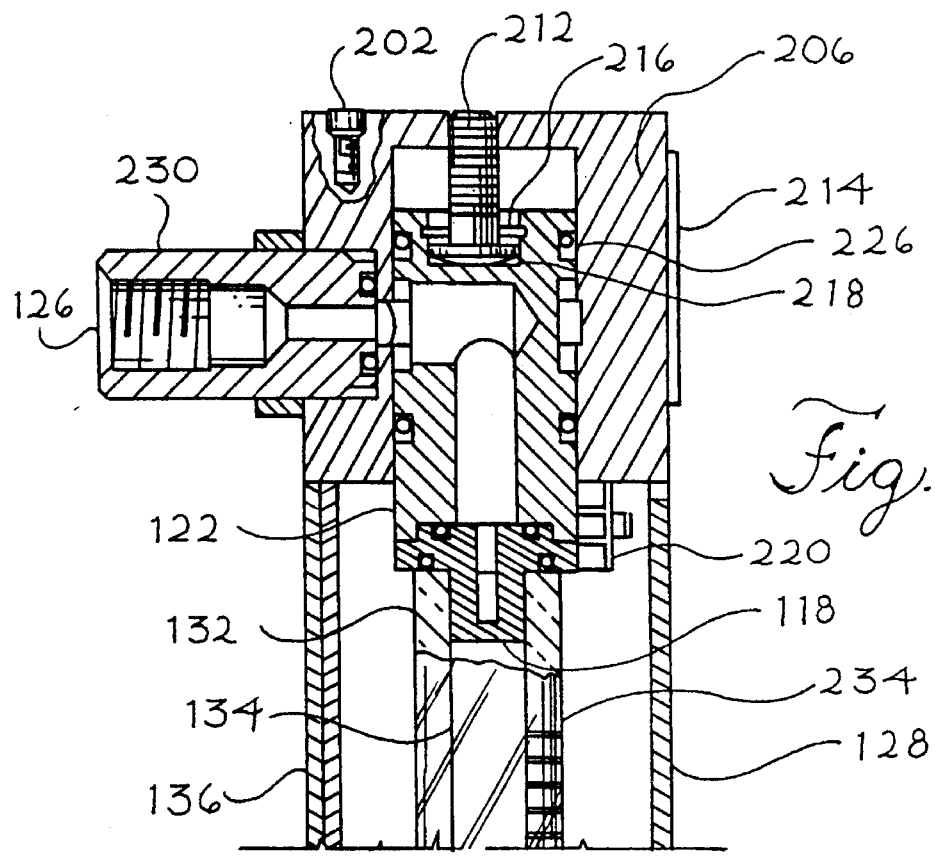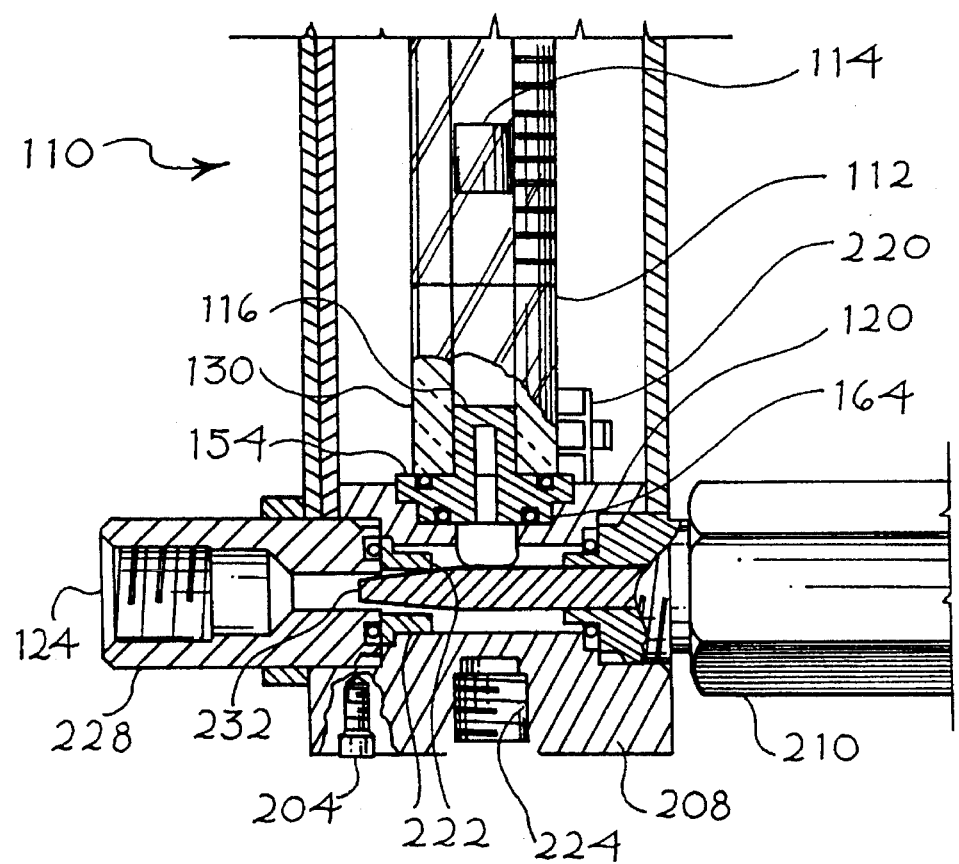
Fig. 10

FLOWMETER WITH IMPROVED END STOPS

BACKGROUND OF THE INVENTION

The present invention relates generally to rotameter-type flowmeters, and more particularly to a flowmeter having improved end stops for enhancing the performance of the flowmeter.

Flowmeters of the variable-area conduit type, or "rotameters", are well-known instruments for measuring the rate of flow of fluids. They generally comprise a vertically-oriented, graduated glass conduit having a tapered longitudinal bore. A weighted float, usually of spherical, cylindrical or annular shape, is disposed in the bore for longitudinal travel along the length of the bore. To center the float within the bore and to guide its longitudinal travel therein, interior ridges extend the length of the conduit parallel to its axis.

End stops or plugs may be inserted into the ends of the bore to prevent leakage of the fluid and to retain the float within the bore. The end stops may provide channels therein to permit fluid to flow from an inflow source, through a channel within an inlet end stop, and into the bore and, subsequently, from the bore through a channel within an outlet end stop.

When no fluid is flowing through the bore, the float will generally rest at the bottom of the conduit upon the inlet end stop. As fluid flow through the bore is initiated and increased above a threshold rate, the pressure exerted on the bottom of the float by the upward flow lifts the float from the inlet end stop upward into the tapered bore.

As the float proceeds upwards, guided by the ridges, the cross-sectional area of the bore gradually increases, creating more and more clearance between the float and the inner surface of the conduit. The upward force exerted on the float by the upward fluid flow thus weakens, as more and more of the flow is diverted around the float through the gaps between the floatguiding ridges, until the upward force precisely offsets the weight of the float, bringing the float into vertical equilibrium. When the flowmeter is properly calibrated to account for the density and viscosity of the flowing fluid as well as for any other variables in the system, the equilibrium position of the float along the length of the graduated conduit can be translated into an accurate measurement of the rate of fluid flow.

Such variable-area conduits are usually made of relatively thin-walled glass and are thus somewhat fragile. The end stops, typically made of polypropylene or polytetrafluoroethylene, may be press-fitted into both ends of the conduit to protect the tube against stresses and may or may not include o-rings to effect fluid-tight sealing of the bore.

U.S. Pat. No. 3,183,713, entitled "Flowmeter", discloses a flowmeter which uses end stops in this manner. The end stops disclosed therein are made of self-lubricating plastic and have portions extending into the conduit to engage and support the float. Openings are provided in the end stops through which fluid flow may enter or exit the bore.

The design of the end stops significantly effects the operational parameters of the flowmeter. In particular, the threshold flow rate for a given fluid to lift the float is largely dependent on the relative configurations of the inlet end stop and the float. Spherical and solid cylindrical floats are typical in the prior art, but due primarily to their large inertias, such floats have relatively high threshold flow rates and may not function well or at all when using less dense or less viscous fluids.

Lighter, annular floats have been employed to increase operational range, particularly on the high end. Because annular floats permit some fluid to flow through the float without exerting upward force thereon, such floats require greater fluid flow to raise them to the same height as for a solid float. Thus, an annular float can measure higher rates of flow than a solid float before reaching the upper end stop.

Annular floats have not been as effective, however, in measuring low rates of fluid flow. Because most end stops provide for a central airflow therethrough, and an annular float initially rests directly upon the end stop, a substantial amount, if not most of the fluid flow may pass through the longitudinal hole in the annular float. At low flow rates, there is insufficient upward force to lift the float from the bottom end stop and maintain it on an elevated position.

Another performance limitation of certain flowmeter designs is a phenomenon whereby a high flow rate or a sudden increase in flow rate causes the float to impinge against the outlet end stop with sufficient force to cause "sticking" of the float to the outlet end stop. Depending upon the configurations of the outlet end stop and the float, it may be possible for the float to wedge itself into the outlet end of the conduit, obstructing the fluid flow and rendering the flowmeter inoperative until the float may be jarred or vibrated loose.

Thus, many current flowmeters have their useful operational range limited by end stop and float designs which require a high threshold flow rate to lift the float off the inlet end stop, and which are susceptible to sticking of the float in the outlet end stop under certain conditions.

SUMMARY OF THE INVENTION

The invention is directed to a flowmeter having an improved end stop which increases the operational range of the flowmeter at both ends. The inlet end stop preferably comprises a machined or integrally molded piece having an annular base section with vertically disposed legs extending upward from one side of the annular base and a transverse raised bridge connecting some or all of the legs. The vertically disposed legs are configured to frictionally interfit with the inlet end of the conduit and the annular base permits vertical fluid flow therethrough.

The transverse bridge obstructs the vertical fluid flow emerging centrally from the bore, thereby causing the fluid flow to diverge into a plurality of flow streams which divergently angle outwardly and upwardly toward the tapered inner surface of the conduit. This lowers the threshold fluid flow required to lift an annular float because the transverse bridge directs the emerging flow against portions of the bottom surface of the annular float and substantially inhibits passage of the flow through the longitudinal hole in the annulus. The transverse bridge also assists in absorbing the force imparted by the float when it strikes the end stop.

The flowmeter also preferably includes an outlet end stop of similar configuration to the inlet end stop, which is effective in limiting or preventing the "sticking" of the float by preventing the float from becoming wedged in the outlet end of the conduit.

BRIEF DESCRIPTION OF THE DRAWINGS

FIG. 1 is a foreshortened sectional view of a flowmeter in accordance with a first embodiment of the invention.

FIG. 4 is a top plan view of an inlet end stop in accordance with the second embodiment of the invention.

FIG. 5 is a front elevational view of an inlet end stop in accordance with the second embodiment of the invention.

FIG. 6 is a side elevational view of an inlet end stop in accordance with the second embodiment of the invention.

FIG. 7 is a top plan view of an inlet end stop in accordance with the first embodiment of the invention.

FIG. 8 is a front elevational view of an inlet end stop in accordance with the first embodiment of the invention.

FIG. 9 is a side elevational view of an inlet end stop in accordance with the first embodiment of the invention.

FIG. 10 is a foreshortened sectional view of a flowmeter in accordance with the second embodiment of the invention.

FIG. 11 is a sectional view taken substantially along the line 11—11 in FIG. 1.

FIG. 12 is a sectional view taken substantially along the line 12—12 in FIG. 1.

DETAILED DESCRIPTION OF PREFERRED EMBODIMENTS

Figure 2:
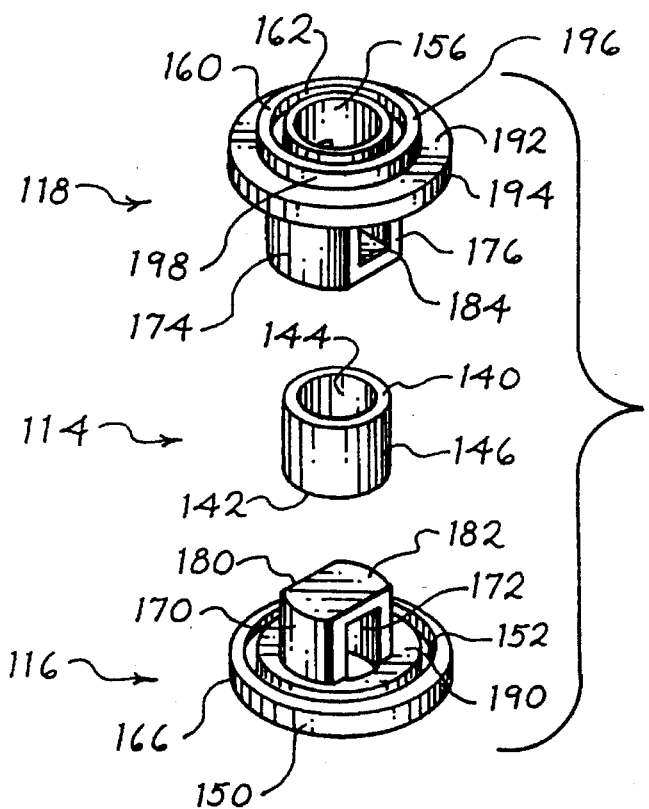
FIG. 2 is a perspective view of two end stops and a float aligned in accordance with a second embodiment of the invention.
Figure 3:
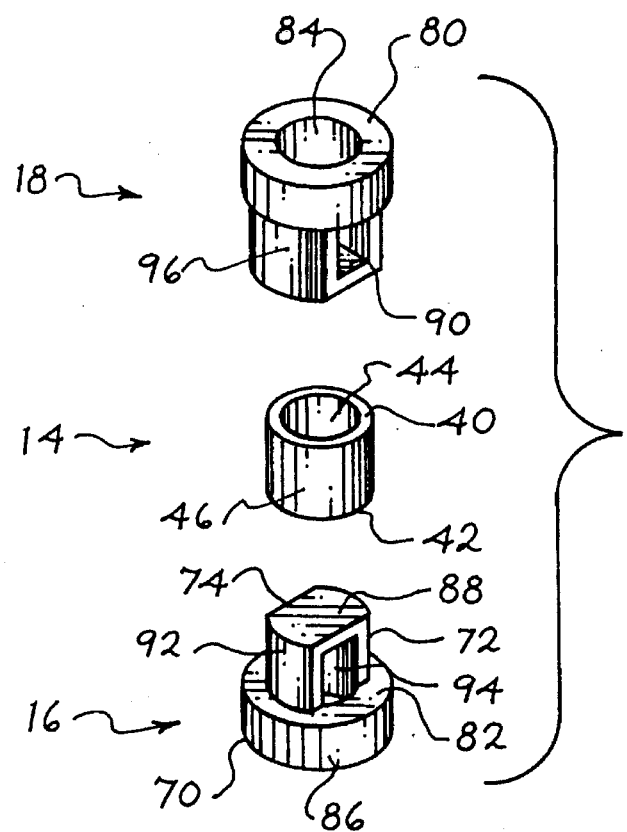
FIG. 3 is a perspective view of two end stops and a float aligned in accordance with the first embodiment of the invention.

The invention is embodied in a flowmeter for measuring fluid flow rates in a controlled environment, having an improved end stop which increases the operational range of the flowmeter. FIG. 1 depicts an improved flowmeter in accordance with a first embodiment of the present invention.

The flowmeter 10 comprises an inlet end stop 16 disposed at the inlet end 30 of a vertically disposed conduit 12 and an outlet end stop 18 disposed at the outlet end 32 of the conduit 12. The preferred embodiment has a shield 28 encircling the glass conduit 12. The shield 28 has internal threads 60 for complementing rotational insertion of inlet busing 20 and outlet bushing 22 which have externally threaded regions 62.

As seen in FIGS. 11 and 12, the flowmeter 10 has circumferentially spaced longitudinal ridges 56 extending along the inside of the glass conduit 12. An annular float 14 is disposed within the bore. In other embodiments the float may be spherical or a solid cylinder. The float is denser than the fluid with which it is used and is preferably made of stainless steel, borosilicate glass or tungsten, but it may also be made from other materials, including plastic, metal and wood. The vertical travel of the annular float 14 is guided by the ridges 56. Although the ridges 56 are parallel to the axis of the conduit and project sufficiently inward to guide the float 14 along the length of the conduit 12, up to the end stops, the diameter of the bore increases toward the upper end of the bore, providing more and more clearance for fluid flow to bypass the float 14 as the float 14 moves upward in the conduit 12, and permitting the float 14 to reach vertical equilibrium.

The inlet end stop 16 is preferably machined or integrally molded, and comprises a base section, a divider section, and an upright section.

As shown in FIG. 1, the base section comprises a base 70 configured to frictionally interfit with the inlet end 30 of the conduit 12 and, as seen in FIGS. 7–9, the base 70 is preferably annular, and includes a top surface 82, a bottom surface 80, an outer surface 86 and an inner surface or bore 84 through which fluid flows from an inlet into the conduit.

An upright section generally comprising a plurality of vertically disposed members or legs 72 extends upwardly from the top surface of the base. The first embodiment has two such vertical members 72 of substantially equal length, spaced oppositely around the annular base 70, and having two opposing parallel sides 92, a convex arcuate side 96 and a concave arcuate side 94. The concave arcuate sides 94 of the vertical legs 72 preferably extend upwardly from the inner surface 84 of the base.

The divider section comprises a transversely extending partitioning member or bridge 74. In the first embodiment, the partitioning member 74 integrally connects the two vertical legs 72 of the upright section, although, in other embodiments, the partitioning member 74 may connect any number of vertical members 72 or may even be integral with the base itself when no vertical members are present.

In the first embodiment, the partitioning member 74 is a horizontally disposed member lying atop the two vertical members 72, covering, and integrally molded to, the tops of the vertical members 72. The partitioning member 74 has a top surface 88, a bottom surface 90, two straight, parallel sides 92 and two convex sides which also form the convex arcuate sides 96 of the vertical members 72.

The partitioning member 74 obstructs the vertical fluid flow emerging centrally from the bore through the base, thereby causing the fluid flow to diverge into a plurality of flow streams which divergently angle outwardly and upwardly toward the inner wall 34 of the conduit 12.

Preferably, the partitioning member is sufficiently raised so as not to significantly constrict the flow of the fluid. That is, the height of the partitioning member above the base of the end stop is preferably great enough that the openings thereby formed in the sides of the stop do not cause a significant back pressure. To this end, the height is preferably greater than or equal to the diameter of the bore 84 through the inlet stop 16.

The width of the partitioning member 74 is preferably greater than 50% of the inner diameter of the annular float, and may be, for example, about 80% of the inner diameter.

End stops in accordance with the invention may be made in various sizes. For purposes of example, the flowmeter of FIG. 1 may have an inner diameter of about ½ in., and an annular float 14 with an outer diameter of approximately ½ in., an inner diameter of approximately 5/16 in., and a height of approximately ½ in. The inlet end stop 16 for this flowmeter may be dimensioned approximately as follows: height of annular base=5/16 in.; outer diameter of annular base=11/16 in.; inner diameter of annular base=11/32 in.; height of vertical members (including partitioning member)=3/8 in.; height of partition member=3/32 in.; length of partition member=½ in.; width of partition member=5/16 in.; and width of flat side of vertical member=7/64 in.

The first embodiment also includes an outlet end stop 18, shown in FIGS. 1, 3 and 7–9, of similar configuration to the inlet end stop 16, which is effective in limiting the "sticking" effect, raising the effective operational bound for the flowmeter 10. The outlet end stop 18 is slightly larger to account for the increased diameter of the conduit 12.

The improved inlet end stop 16 significantly reduces threshold flow rates and allows a much larger operational range for the flowmeter 10. By causing the fluid flow to diverge into a plurality of flow streams which angle outwardly and upwardly toward the tapered inner surface of the conduit 12, the inlet end stop 16 directs the emerging flow against the bottom surface 42 of the annular float 14 and substantially inhibits passage of the flow through annular float 14. The float 14 is thereby lifted off the inlet end stop 16 at a far lower flow rate than if flow was directed through the float 14.

The partitioning member 74 of the outlet end stop 18 provides superior sturdiness when the float 14 impinges it and prevents the float 14 from wedging itself into the outlet end 32 of the conduit 12 and disabling the flowmeter 10.

A flowmeter 110 in accordance with a second embodiment of the invention, which may also achieve the operational advantages discussed above, is shown in FIG. 10. The flowmeter 110 has an inlet port 124, housed within an inlet fitting 228, for fluid to enter the flowmeter 110, and an outlet port 126, housed within an outlet fitting 230, for fluid to exit the flowmeter 110. A valve assembly 210 may be used to adjust the amount of flow passing into the flowmeter 110 from the inlet port 124. The illustrated valve assembly 210 comprises a tapered valve stem 232 and valve seats 222 to effect changes in the flow rate through the flowmeter 110.

A bottom block 208 and top block 206 support an inlet bushing 120 and an outlet bushing 122. The top block 206 and the bottom block 208 have top and bottom mounting screws 202 and 204, respectively, which affix the body of the flow meter 110 to an aluminum u-shaped extrusion which surrounds and protects most of the inner structure of the flowmeter 110.

Affixed between the inlet bushing 120 and the outlet bushing 122, the flowmeter 110 has a vertically disposed conduit 112 and an appropriately dimensioned float 114 disposed within the conduit 112 to translate vertically therein. The float 114 moves up and down in response to vertical forces, the weight of the float 114 and an upward force exerted on the float 114 by an upward fluid flow longitudinally through the conduit 112.

The flowmeter 110 has a central cylinder screw 212, and a corresponding central cylinder screw socket 224. The central cylinder screw 212, in conjunction with a retaining ring 216, a flat washer 218, and fitting o-ring 226 may be used to inhibit leakage of the fluid from the flowmeter 110.

Flowmeter 110 also has spring clips 220 for retaining graduated overlays which facilitate flow rate measurements of a commonly measured fluid. If the relevant properties of a fluid are known, then, for a particular flowmeter, it is possible to create a graduated strip to overlie and obscure the graduation line 234 of the conduit. The graduated overlay would be designed to provide a direct visual observation of the flow rate measurement without any subsequent calculations.

The flowmeter 110 also comprises an inlet end stop 116 disposed at the inlet end 130 of the conduit 112 and, preferably, an outlet end stop 118 disposed at the outlet end 132 of the conduit 112. This embodiment also has a shield 128 which surrounds the glass conduit 112 throughout its length.

As in the first embodiment, the second embodiment has longitudinal ridges 134 extending along the inside of the conduit 112. The float 114 is annular, as seen in FIG. 10, and the outer wall of the annular float 114 travels along the ridges 134 while some of the fluid flow may pass around the float 114 between the ridges 134. Although the ridges 134 are parallel to the axis of the conduit and project sufficiently inward to guide the float 114 along the length of the conduit 112, the diameter of the bore increases at the upper end of the bore, providing more and more clearance for fluid flow to bypass the float 114 as the float 114 moves upward in the conduit 112, permitting the float 114 to reach vertical equilibrium.

The inlet end stop 116 is preferably machined or integrally molded, and comprises a base section and a divider section, and an upright section.

As shown in FIG. 10, the base section comprises a base 166 configured to frictionally interfit with the inlet end 130 of the conduit 112 and, as seen in FIGS. 4–6, the base has a top disk 150 and a relatively smaller bottom disk 160, concentrically layered and having a central bore defined by mutual inner wall 156. The top disk 150 has a top surface 190, a bottom surface 192 and a side surface 194. The bottom disk 160 has a bottom surface 196 and a side surface 198. The bottom disk 160 is molded flush against the bottom surface 192 of the top disk 150.

The top surface 190 of the top disk 150 has a concentrically circular top groove 152. The profile of top groove 152 comprises three sides of a rectangle and is configured to maintain an appropriately sized top o-ring 154 to effect a tighter seal. Similarly, the bottom surface 196 of the bottom disk 160 has a concentrically circular bottom groove 162. The profile of bottom groove 162 also comprises three sides of a rectangle and is configured to maintain an appropriately sized bottom o-ring 164 for a tighter seal.

An upright section, generally comprising a plurality of vertically disposed members or legs 170 extends upwardly from the top surface 190 of the top disk 150 of the base. The second embodiment has two such members 170 of substantially equal length, spaced oppositely around the annular base, and having two opposing parallel sides 176, a convex arcuate side 174 and a concave arcuate side 172. The concave arcuate sides 172 of the members 170 extend upwardly from the inner wall 156 of the base.

The divider section comprises a transversely extending partitioning member 180. In the second embodiment, the partitioning member 180 integrally connects the two vertically disposed members 170 of the upright section, although, in other embodiments, the partitioning member 180 may connect any number of vertical members or may even be integral with the base itself when no vertical members are present.

The partitioning member 180 is a horizontally disposed member lying atop the two vertical members 170, covering, and integrally molded to, the tops of the horizontal members 170. The member 180 has a top surface 182, a bottom surface 184, two straight, parallel sides 188 and two convex sides 186 which overlay the convex arcuate sides 174 of the vertical members 170.

The partitioning member 180 obstructs the vertical fluid flow emerging centrally from the bore through the base, thereby causing the fluid flow to diverge into a plurality of flow streams which divergently angle outwardly and upwardly toward the inner wall 136 of the conduit 112.

Preferably, the partitioning member is sufficiently raised so as not to significantly constrict the flow of the fluid. As in the first embodiment, the height of the partitioning member should be large enough not to significantly constrict the flow and the partitioning member should be wide enough to avoid significant fluid flow through the float when it is resting on the inlet end stop.

As in the first embodiment, the size of the various components may vary, but the relevant dimensions of the second embodiment are the same as for the first except that the base section is configured and sized to interfit with inlet bushing 120.

The second embodiment also includes an outlet end stop 118, shown in FIGS. 2 and 10, of similar configuration to the inlet end stop 116, which is effective in limiting the sticking effect, raising the effective operational bound for the flowmeter 110. The outlet end stop 118 is slightly larger in some dimensions to account for the increased inner diameter of the conduit 112.

In the illustrated embodiments, the angle at which the flow streams diverge depends partially upon the distance of the partitioning member from the outlet of the bore, the width of the partitioning member, the flow rate of the fluid, and certain inherent properties of the given fluid.

The divergent flow streams are particularly effective in lowering the threshold fluid flow required to lift an annular float. The partitioning member also provides additional sturdiness to the flowmeter, particularly when the float impacts the end stop. Furthermore, a label 214 may be used to provide instructions to further indicate proper use and maintenance or parameters or origin of the flowmeter 110.

A flowmeter with end stops in accordance with the invention increases the operable range of the flowmeter at both ends. From the foregoing, it will be appreciated that the invention provides a novel and improved flowmeter with end stops. The invention is not limited to the particular embodiments described above or to any particular embodiment. In particular, there is no intent to limit the configuration of the end stops to the embodiments described above. Variations including, but not limited to, end stops having no vertical members may be employed. Neither shall the specific configuration of the interfitting bushings in the illustrated embodiments be construed to limit the scope of the claims.

The invention is described in the following claims.

What is claimed is:

1. A flowmeter comprising:

a vertically disposed conduit having an inlet end and an outlet end;

a float freely disposed within said conduit, said float being dimensioned to fit within said conduit and move vertically within said conduit in response to an upward force exerted on said float by an upward fluid flow through said conduit; and an inlet end stop disposed at said inlet end of said conduit, said inlet end stop comprising a base section, an upright section, and a flow-divider section, said inlet end stop having a bore for permitting vertical fluid flow therethrough, said upright section being configured to frictionally interfit with said inlet end of said conduit and comprising a plurality of vertically disposed members, integral with and extending upwardly from said base section, said flow-divider section comprising a raised, transversely extending partitioning member integrally connecting a plurality of said vertically disposed members, said partitioning member obstructing said vertical fluid flow emerging centrally from said bore thereby causing said fluid flow to diverge into a plurality of flow streams within said conduit.

2. A flowmeter in accordance with claim 1 wherein the cross-sectional area within said conduit uniformly increases from the inlet end of said conduit to the outlet end of said conduit.

3. A flowmeter in accordance with claim 2 wherein said vertically disposed conduit has a tapered interior.

4. A flowmeter in accordance with claim 3 wherein:

said conduit is of substantially circular cross-section;

said base section of said inlet end stop has a generally circular perimeter; and said bore for permitting fluid flow through said base section is substantially cylindrical and substantially concentric with said generally circular perimeter.

5. A flowmeter in accordance with claim 4 wherein said float is substantially annular and has a longitudinal hole extending therethrough, said annular float being in substantial axial alignment with said conduit.

6. A flowmeter in accordance with claim 5 wherein said vertically disposed members have arcuate inner and outer surfaces, such that said vertically disposed menders substantially align with said bore of said inlet end stop and interfit with said inlet end of said conduit.

7. A flowmeter in accordance with claim 4 wherein said partitioning member is sufficiently raised from said base section such that said partitioning member does not significantly constrict the flow.

8. A flowmeter in accordance with claim 7 wherein said partitioning member is raised from said base section at least as far as the diameter of said bore.

9. A flowmeter in accordance with claim 4 wherein the width of said partitioning member is at least half of the diameter of said hope extending through said float.

10. A flowmeter in accordance with claim 9 wherein the width of said partitioning member is about 80% of the diameter of said hole.

11. A flowmeter in accordance with claim 1 further comprising a tubular shield laterally encircling said conduit from said inlet end to said outlet end.

12. A flowmeter in accordance with claim 1 wherein said partitioning member integrally connects said plurality of said vertically disposed members at the upper ends of said vertically disposed members.

13. A flowmeter in accordance with claim 1 wherein said end stop is comprised of polytetrafluoroethylene.

14. A flowmeter in accordance with claim 1 wherein said conduit has longitudinal ridges along its interior for guiding the vertical travel of said float.

15. A flowmeter in accordance with claim 1 further comprising an outlet end stop disposed at said outlet end of said conduit, said outlet end stop comprising a base section, an upright section, and a flow-divider section, said outlet end stop having a bore for permitting vertical fluid flow therethrough, said upright section of said outlet end stop being configured to frictionally interfit with said outlet end of said conduit and comprising a plurality of vertically disposed members, integral with and extending downwardly into said conduit from said base section of said outlet end stop, said flow-divider section of said outlet end stop comprising a raised, transversely extending partitioning member integrally connecting a plurality of said vertically disposed members.

16. A flowmeter comprising:

a vertically disposed conduit having an inlet end and an outlet end;

a float disposed within said conduit, said float being dimensioned to fit within said conduit and move vertically within said conduit in response to an upward force exerted on said float by an upward fluid flow through said conduit; and an end stop disposed at said inlet end of said conduit, said end stop comprising a base section and a flow-divider section, said base section having a bore for permitting said vertical fluid flow therethrough, said flow-divider section being configured to frictionally interfit with said inlet end of said conduit and comprising a transversely extending partitioning member integral with said base member but not disposed within said bore of said base section, said partitioning member obstructing said vertical fluid flow emerging centrally from said bore thereby causing said fluid flow to diverge into a plurality of flow streams.

17. A flowmeter in accordance with claim 16 wherein said vertically disposed conduit is generally tapered with respect to one of said ends of said conduit.

18. A flowmeter in accordance with claim 17 wherein:

said conduit is of circular cross-section;

said base section of said inlet end stop has a generally circular perimeter; and said bore for permitting fluid flow through said base section is substantially cylindrical and substantially concentric with said generally circular perimeter.

19. A flowmeter in accordance with claim 16 wherein said float is substantially annular and has a longitudinal hole extending therethrough, said annular float being in substantial axial alignment with said conduit.

20. A flowmeter comprising:

a vertically disposed conduit having an inlet end and an outlet end;

a float disposed within said conduit, said float being dimensioned to fit within said conduit and move vertically within said conduit in response to an upward force exerted on said float by an upward fluid flow through said conduit; and a means for diverging said fluid flow into a plurality of flow streams which divergently angle outwardly toward said inner surface of said conduit, said means being disposed within said inlet end of said conduit.

* * * * *